UNITED STATES PATENT OFFICE 2,386,427

VULCANIZATION OF OLEFIN-DIOLEFIN COPOLYMERS

Samuel Breck, Rutherford, N. J., assignor to United States Rubber Company, New York, N. Y., a corporation of New Jersey No Drawing. Application April 28, 1943, Serial No. 484,875

4 Claims. (Cl. 260—93)

This invention relates to the vulcanization of olefin-diolefin copolymers, and more particularly those copolymers of an olefin and a diolefin which are known to the trade as butyl rubber, and which are referred to in British Patent No. 523,248, and in Ind. & Eng. Chem. 32, pp. 1283 et seq. (1940). Butyl rubber usually possesses less than 10% of the unsaturation of natural rubber.

It has been known to vulcanize the butyl type rubbers with tetramethyl thiuram disulfide together with sulfur, but such vulcanizates are characterized by low modulus, low resilience, and high hysteresis. To obtain more satisfactory vulcanizates a combination of p-quinone dioxime and lead dioxide has been used. This gave a higher modulus, higher resilience, and lower hysteresis, and had the further advantage of requiring a lower temperature and a shorter time to reach optimum cure, compared with the use of sulfur and a thiuram accelerator. However, the dioxime-lead dioxide combination suffers from the disadvantage of being extremely scorchy on the mill, and in subsequent processing, i. e., calendering, extruding, etc., so that it cannot be processed by the methods usual in the rubber industry. In addition, at the temperatures at which it cures best, viz., around 240° F., difficulty is experienced in obtaining proper flow of the stock in the mold.

An object of the present invention is to provide a curing combination for the butyl type rubbers which will avoid the disadvantages of using the dioxime-lead dioxide combination, and yet retain some of its advantages. Other objects will be apparent from the description hereinafter given.

According to the present invention, vulcanization is effected by heating the butyl rubber in admixture with p-quinone dioxime and "o-quinone dioxime peroxide." Authorities differ as to the actual formula of the latter, that is, whether the products subscribe to the peroxide formula illustrated by

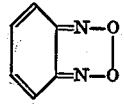

or the epoxy-benzofurazane formula, illustrated by

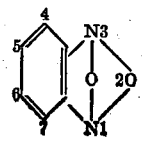

For the purposes of the present invention, however, the chemicals are designated as 1,3-epoxy-benzofurazanes, examples of which are 1,3-epoxy-benzofurazane, 4-chloro-1,3-epoxy-benzofurazane, 5-chloro-1,3-epoxy-benzofurazane, and 4-methyl and 5-methyl 1,3-epoxy-benzofurazanes. By means of this combination of curing agents it is possible to retain most of the advantages of the p-quinone dioxime-lead dioxide cure, and at the same time have the scorch resistance high enough to permit factory processing of the butyl rubber compounds by usual methods. Furthermore, the present invention allows the butyl rubber stock to reach its optimum cure at the same temperature and time as similar natural rubber stocks. This aforesaid combination of the present invention appears to be specific, because the isomeric o-quinone dioxime has no vulcanizing action on butyl rubber either with or without the addition of o-quinone dioxime peroxide.

The proportion by weight of the p-quinone dioxime may vary but usually ranges from 1% to 5% based on the butyl type rubber; and the proportion of o-quinone dioxime peroxide usually ranges from 1% to 5% based on the butyl type rubber. The most efficient proportion of the former is from about 1% to about 2%, and the most efficient proportion of the latter is from about 1% to about 3% by weight. These materials are preferably added to the butyl rubber on a mill internally cooled with water so as to avoid scorch. The chemicals may be added at any time during the mixing procedure, but preferably at the end, in the same manner as sulfur and sulfur accelerators are added in natural rubber mixes. Other compounding ingredients may be added, as desired, such as fillers, pigments, antioxidants, softeners, etc.

The following example is given to illustrate the invention, in which the stock A represents the present invention, and the stock B represents prior art, the parts being by weight:

|  | A | B |
|---|---|---|
| Butyl rubber | 100 | 100. |
| Stearic acid | 3 | 3. |
| Channel black | 60 | 60. |
| p-Quinone dioxime | 2 | 2. |
| Lead dioxide |  | 6. |
| o-Quinone dioxime peroxide | 3 |  |
|  | The A stock was milled and sheeted with no evidence of scorch, and was press-cured 45 minutes at 293° F. | Press cure 40 minutes at 239° F. |

The properties of the cured stocks were as follows:

|  | A | B |
|---|---|---|
| Mooney plastometer scorch resistance— | | |
| At 250° F.[1] ..................... minutes.. | 3-4 | ..... |
| At 212° F.[1] ..................... do.... | ..... | 1 |
| Tensile at break ................ lbs./sq. in.. | 1,700 | 2,200 |
| Modulus at 300% elongation ........ do.... | 900 | 1,200 |
| Elongation at break .............. percent.. | 460 | 460 |
| Permanent set .................... do.... | 23 | 14 |
| Percent rebound at room temperature......... | 9.0 | 7.0 |
| Torsional hysteresis at 280° F. (logarithmic decrement). | .381 | .293 |

[1] (Time at which the rate of increase of the Mooney viscosity reaches a value of 2 units per minute.)

The data show that butyl rubber compounded with the new vulcanizing agents according to the invention has high scorch resistance even at 250° F., whereas butyl rubber compounded with p-quinone dioxime and lead dioxide according to prior art, scorches rapidly even at the considerably lower temperature of 212° F. The data also show that vulcanizates made according to the invention have satisfactory tensile strength, modulus, and resilience.

Having thus described my invention, what I claim and desire to protect by Letters Patent is:

1. A method of vulcanizing an elastomer which is a copolymer of an olefin and a conjugated di-olefin, which copolymer has a degree of unsaturation less than ten percent of that of natural rubber, which comprises heating the elastomer after admixture with para-quinone dioxime and a 1,3-epoxybenzofurazane.

2. A method of vulcanizing an elastomer which is a copolymer of an olefin and a conjugated di-olefin, which copolymer has a degree of unsaturation less than ten percent of that of natural rubber, which comprises heating the elastomer after admixture with para-quinone dioxime and 1,3-epoxybenzofurazane.

3. A mixture comprising a copolymer of an olefin and a conjugated diolefin, para-quinone dioxime and a 1,3-epoxybenzofurazane, the said copolymer having a degree of unsaturation less than ten percent of that of natural rubber.

4. The vulcanization product of a mixture comprising a copolymer of an olefin and a conjugated diolefin, para-quinone dioxime and a 1,3-epoxybenzofurazane, the said copolymer having a degree of unsaturation less than ten percent of that of natural rubber.

SAMUEL BRECK.